United States Patent
Oberheim et al.

(10) Patent No.: US 11,099,547 B2
(45) Date of Patent: Aug. 24, 2021

(54) CONTROL-INTERACTION METHOD AND COMMUNICATION DEVICE FOR CARRYING OUT A CONTROL INTERACTION BETWEEN AN ELECTRONIC OPERATING SYSTEM AND AN ACTUATING SYSTEM

(71) Applicant: SAMSON AKTIENGESELLSCHAFT, Frankfurt (DE)

(72) Inventors: Rainer Oberheim, Bensheim (DE); Joerg Kiesbauer, Eppertshausen (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 240 days.

(21) Appl. No.: 16/332,736

(22) PCT Filed: Sep. 6, 2017

(86) PCT No.: PCT/EP2017/072380
§ 371 (c)(1),
(2) Date: Mar. 12, 2019

(87) PCT Pub. No.: WO2018/046556
PCT Pub. Date: Mar. 15, 2018

(65) Prior Publication Data
US 2019/0369599 A1    Dec. 5, 2019

(30) Foreign Application Priority Data
Sep. 12, 2016   (DE) .................. 10 2016 117 073.9

(51) Int. Cl.
*G05B 19/416*    (2006.01)
*G05B 19/04*    (2006.01)

(52) U.S. Cl.
CPC .. *G05B 19/416* (2013.01); *G05B 2219/37371* (2013.01)

(58) Field of Classification Search
CPC ........ G05B 19/416; G05B 2219/37371; G05B 19/0428; G05B 19/0423
(Continued)

(56) References Cited

U.S. PATENT DOCUMENTS

| 5,970,430 A | 10/1999 | Burns et al. |
| 8,649,909 B1 * | 2/2014 | Phillips ............ G05B 9/02 700/282 |

(Continued)

FOREIGN PATENT DOCUMENTS

| DE | 69717838 T2 | 9/2003 |
| DE | 102012021387 B3 | 2/2014 |

(Continued)

OTHER PUBLICATIONS

German Search Report; dated Mar. 22, 2017 for DE patent application No. 102016117073.9 (includes English translation).
(Continued)

*Primary Examiner* — Michael J Brown
(74) *Attorney, Agent, or Firm* — Schiff Hardin LLP

(57) ABSTRACT

A communication device for control interaction between operating electronics and an actuator to set a process fluid flow of a process-engineering plant can include a first communication interface configured to receive electrical signals from the operating electronics, a second communication interface configured to provide electrical actuator commands to the actuator, and a permissibility processor having a data memory that stores permissible actuator commands, the permissibility processor being configured to cause the second communication interface to provide one of the permissible actuator commands to the actuator based on
(Continued)

an electrical signal of the electrical signals received via the first communication interface.

14 Claims, 1 Drawing Sheet

(58) Field of Classification Search
USPC .......................................................... 700/282
See application file for complete search history.

(56) References Cited

U.S. PATENT DOCUMENTS

| | | |
|---|---|---|
| 9,506,482 B2 | 11/2016 | Valentin-Rumpel |
| 9,645,584 B2 | 5/2017 | Kucera et al. |
| 2011/0054828 A1 | 3/2011 | Junk |
| 2014/0068712 A1 | 3/2014 | Frenkel et al. |
| 2017/0357235 A1 | 12/2017 | Mayer et al. |

FOREIGN PATENT DOCUMENTS

| | | |
|---|---|---|
| DE | 102014119214 A1 | 6/2016 |
| EP | 2998652 A1 | 3/2016 |

OTHER PUBLICATIONS

PCT Written Opinion of the International Searching Authority; dated Nov. 27, 2017 for International Application No. PCT/EP2017/072380 (English translation attached).
International Search Report; dated Nov. 27, 2017 for PCT Application PCT/EP2017/072380 (English Translation).
International Preliminary Report on Patentability dated Mar. 12, 2019, International Application No. PCT/EP2017/072380 (English translation included).

\* cited by examiner

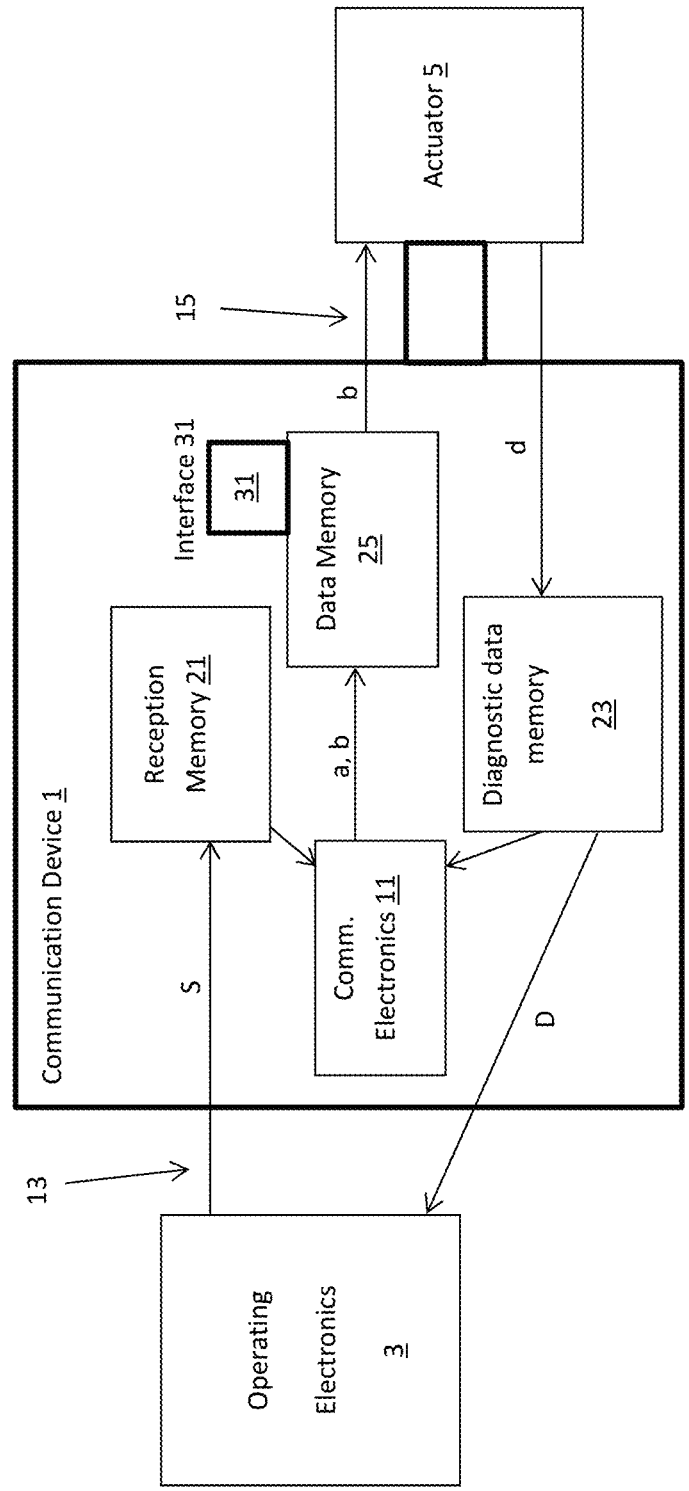

CONTROL-INTERACTION METHOD AND COMMUNICATION DEVICE FOR CARRYING OUT A CONTROL INTERACTION BETWEEN AN ELECTRONIC OPERATING SYSTEM AND AN ACTUATING SYSTEM

CROSS REFERENCE TO RELATED APPLICATIONS

This application is a National Stage of International Application No. PCT/EP2017/072380, filed Sep. 6, 2017, which claims priority to and the benefit of German (DE) Patent Application No. 10 2016 117 073.9, filed Sep. 12, 2016, each of which is incorporated herein by reference in its entirety.

BACKGROUND

Field

The disclosure relates to a communication device for carrying out a control interaction between an operating electronic and an actuator, for example a control valve, a pump or the like, for adjusting a process fluid flow of a process plant, such as a chemical plant, in particular a petrochemical plant, a food processing plant, a power station or the like, which has control and/or regulating electronics for actuating the actuator in accordance with an actuator command, the control and/or regulating electronics being configured to carry out a predetermined function, in particular for actuating the actuator, as a function of a predefined actuator command, such as an actuating setpoint value. The disclosure also relates to a system which comprises at least one actuator and at least one communication device. Furthermore, the disclosure concerns a corresponding control interaction method.

Related Art

For the control of actuators in process plants, process control networks are usually used which, for example, communicate and are structured in accordance with the relevant Fieldbus Foundation Standard, Profibus Standard or HART Standard. The structure and use of such a process control network is described, for example, in DE 697 17 838 T2. In the known process control network, the process control functions are implemented in a distributed manner using a group of fieldbus devices. The process control network described includes standardized physical interfaces for a two-wire loop that connects all individual field devices, such as sensors, actuators, control units, valves, etc., that are present in the process plant. In this way, the process system network described in DE 697 17 838 T2 forms a physical LAN (Local Area Network) of field devices within the process plant, enabling the individual field devices of the plant to perform control functions at distributed locations within the plant and to communicate with each other before and after the execution of the control functions. Communication using the fieldbus protocol, as described in DE 697 17 838 T2, allows control functions to be distributed throughout the entire process control network to reduce or eliminate the complexity of a central controller or control system. The local process control network also includes an interface to an external control console that can request the process control network to perform diagnostic tests. For this purpose, according to DE 697 17 838 T2, the external control console or DCS control unit can be configured in such a way that the various devices within the process engineering plant are directly controlled via setpoint input and the output values of the devices or other process parameters are measured. The measured values can then be used to determine a diagnostic result, which can then be used as the basis for maintenance work, for example.

When using a process control network, there is a problem, especially in process engineering plants such as petrochemical plants or power plants, that improper use of an external control console, which in itself is only intended for carrying out diagnoses, can impair the process control of the plant to such an extent that safety-critical conditions occur. In particular, access by unauthorized third parties to an external control console carries the risk that a sensitive process can be disturbed by the deliberate triggering of a field device control command from the external console in such a way that the process plant is damaged or an automatic emergency shutdown occurs, which avoids damage to the plant itself, but results in undesired downtimes.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates a schematic depiction of the control interaction in a system with a communication device according to an exemplary embodiment of the present disclosure.

The exemplary embodiments of the present disclosure will be described with reference to the accompanying drawings. In the drawings, the same or similar reference signs are used for identical or similar components.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to overcome the disadvantages of the state of the art, including to prevent improper operation of actuators of a process plant due to operating errors or unauthorized access using external control consoles.

A communication device according to an exemplary embodiment and for carrying out a control interaction between control electronics and an actuator is described. The control electronics can include, for example, a control console, a computer, a smartphone, a tablet or the like. The actuator can include, for example a control valve, a pump or the like. The communication device can be configured to adjust a process fluid flow of a process-engineering plant, such as a chemical plant, in particular a petrochemical plant, a food-processing installation, a power station or the like. In an exemplary embodiment, the actuator includes control and/or regulating electronics configured to actuate the actuator in accordance with an actuator command signal, and to carry out predetermined functions, such as actuating the actuator, as a function of predefined actuator commands, such as setpoint values. In an exemplary embodiment, the actuator together with a control electronics forms a field device. The actuator may, for example, be a control valve with an electric or pneumatic actuator, whereby the valve body of the control valve may be connected to the actuator by means of an upper part such as a yoke, a lantern or an actuator stem or drive shaft guide. For example, the control and/or regulating electronics can be enclosed in a separate housing and attached directly to the actuator, especially to the upper part, or housed together with the actuator in a web or field device housing.

An actuator command can, for example, be a set point value that corresponds, for example, to a desired set position of a control valve or a desired set volume or pressure of a positioning pump. An actuator command can include a set-setpoint sequence, for example to perform a hysteresis test, a partial stroke test or similar. An actuator command can also be an emergency close or an emergency open command. In an exemplary embodiment, the actuator command signal is an analog signal. In an exemplary embodiment, the signal is a 4-20 mA signal, but is not limited thereto. In an exemplary embodiment, an actuator command signal can be digital, such as a signal formatted as a Profibus, HART or Fieldbus signal, but is not limited thereto. In the control and/or regulation electronics, the predetermined assignment of actuator commands to the (actuating) functions of the actuator to be performed is implemented by hardware and/or software. In an exemplary embodiment, the control and/or regulation electronics comprise a microprocessor, a controller or other analog or digital logic circuit for assigning an actuator (actuating) function to an actuator command. In an exemplary embodiment, the control and/or regulating electronics includes processor circuitry that is configured to actuate the actuator and/or carry out or induce/control one or more predetermined functions of the actuator.

In an exemplary embodiment, the communication device comprises a first communication interface for receiving electrical signals, such as actuator commands, from the operating electronics. The first communication interface can therefore also be referred to as a receiver or transceiver interface. The first communication interface can receive analogue or digital signals, such as power or voltage signals, transmitted by cable, and/or wireless signals, such as electromagnetic signals. Furthermore, the communication device according to the disclosure includes a second communication interface for sending electrical actuator commands to the actuator. The second communication interface can send actuator commands in particular to the control and/or regulating electronics for actuating the actuator in order to tell the actuator electronics according to which actuator command a predetermined function of the actuator is to be executed.

In an exemplary embodiment, the communication device comprises an electronic permissibility checker with a data memory in which a series of permissible actuator commands is stored, the permissibility checker being configured to cause the second communication interface, depending on an electrical signal received by means of the first communication interface, either not to send an actuator command or to send one of the permissible actuator commands to the actuator. By using the electronic permissibility checker, the communication device in accordance with the disclosure ensures that only permissible actuator commands can be transmitted from an electronic control unit, such as an external control console, to an actuator of a process plant. By using the permissibility checker, it can be ensured that, for example, only non-safety-critical commands can be triggered to actuate an actuator by using a control electronics and, in particular, an external control console such as a smartphone or the like. In this way, a safety barrier is provided which excludes an unsafe control of the actuator of the process plant due to operating errors or misuse. The communication device serves in this respect as a filter device, which only allows the actuator to be given commands by the external operating electronics, in particular, which are predetermined as permissible and stored in the data memory of the permissibility checker, and/or which prevents a user, who has access (only) to the operating electronics, from fully influencing the functionality of the actuator by means of the external operating electronics, in particular. The communication device in accordance with an exemplary embodiment of the disclosure can also exclude the possibility that malicious software, in particular the positioner's own software and/or hardware, can access the positioner and damage it, in particular from an external operating electronics.

Permissible actuator commands can, for example, be defined in the form of a permissible control range for a control valve, for example 80% of the total control valve, and/or between a 10% and 90% open position. Alternatively, it is conceivable that only a small control range of, for example, 5% or 10% of the range, especially near a predefined actuator setpoint position, for example, a setpoint position currently specified by a control room, a fully open position, a fully closed position, or the like, forms a frame for permissible actuator commands that is stored in the data memory of the electronic permissibility checker. It is also conceivable as an alternative that for predetermined actuators at least one functional routine is stored as a permissible actuator command in the data memory of the electronic permissibility checker, for example a predetermined partial stroke routine or the like. It is also conceivable that predetermined, specific actuator commands are stored in the data memory, for example for a control valve predetermined position setpoints corresponding to approximately 30%, 40%, 50%, 60% and/or 70% of the open position, or for example for 10%, 20%, 30%, 40% and/or 50% of the maximum pump output.

A permissible actuator command may also be, for example, a command which causes the actuator electronics or the actuator itself to return a response signal, in particular to cause a sensor and/or actuator functionality of the actuator, such as a movement to a setpoint position or operation with a setpoint power or the like. A response signal requested by a permissible actuator command may, for example, concern an actual operating condition of the actuator, such as an actual pressure, an actual position, an actual power or the like, or other actuator-specific information, such as a target condition or an actual deviation from a target condition, a diagnostic result determined by the actuator or its control and/or regulating electronics, or the like. Permissible actuator commands, in particular, can be formatted as binary sequences. The permissible actuator commands are stored in the data memory in such a way that it is impossible for the operating electronics to modify predetermined permissible actuator commands, in particular to delete, change and/or add them.

In an exemplary embodiment of the communication device, the permissibility checker is arranged to perform a comparison of a signal received by the control electronics via the first communication interface with the series of permissible actuator commands in order to detect whether a permissible actuator command corresponding to the received signal is stored in the data memory, and wherein the permissibility checker is further configured, if a permissible actuator command corresponding to the received signal is stored in the data memory, to cause the second communication interface to send that permissible actuator command corresponding to the received signal to the actuator. In an exemplary embodiment, the permissibility checker is configured to perform an identity comparison between the received signal and the permissible actuator command. Alternatively, the permissibility checker may be configured to perform an approximate comparison, whereby a received signal, e.g. a setpoint control signal, is assigned by the permissibility checker to a not necessarily identical, merely similar actuator command. For example, the permissibility checker can include a number of specific predefined setpoints and, depending on the signal received, assign a preferably closest setpoint signal to be sent to the actuator.

In an exemplary embodiment of a communication device, the permissibility checker is also configured to carry out an authorization check related to the signal received by means of the first communication interface. In particular, the permissibility checker may be arranged to check whether the signal received via the first communication interface includes an authorization identifier and to cause the second communication interface to send an authorized actuator command only if an authorization identifier is recognized. The permissibility checker is therefore configured to carry out a permissibility check and also an authorization check. An authorization identifier can, for example, be a code, a key code or the like, which is assigned in particular to a specific user and/or a specific operating electronics and preferably indicates or implies his or her authorization to actuate the actuator. It is conceivable that different users or different operating electronics units are assigned different individual authorization codes, so that, for example, different users or operating electronics units are authorized to execute different permissible actuator commands.

In an exemplary embodiment of a communication device, the data memory in which the series of permissible actuator commands is stored has a mechanical and/or electronic write protection which prevents the actuator commands stored in the data memory from being altered by a signal received by means of the first communication interface. Alternatively or additionally, the data memory may have a mechanical and/or electronic write protection which permits write access to the data memory, preferably exclusively by means of a third communication interface on the communication device, in particular a hardware interface, such as a plug contact, for example a serial plug contact or a USB plug contact, directly on the communication device. In this way, it can be ensured that the predetermined series of permissible actuator commands, which can be initiated with the aid, for example, of external operating electronics such as a smartphone, can only be defined and, if necessary, modified by direct physical, in particular mechanical, access locally on site in the process plant to the actuator to be controlled. This means that in order to modify the list of permissible actuator commands, especially to add, change or remove permissible actuator commands, the person who defines which actuator commands are stored as permissible in the data memory of the electronic permissibility checker must work personally on the relevant actuator on site, so that he or she must first undergo a safety check, for example in safety-critical plants such as petrochemical plants or power plants, such as nuclear power plants, to ensure that unauthorized access is excluded. It is clear that the third communication interface is a predetermined security interface that is necessarily different from the first.

In an exemplary embodiment of a communication device, the communication device, in particular its second communication interface, is configured to receive operating data, such as valve position, control difference, actuating signal, actuator signature, actuator hysteresis or the like, from the actuator, the permissibility checker also being configured to allow and/or prevent the transmission of actuator commands to the actuator, in particular its control and/or regulating electronics, as a function of the received operating data. In addition or alternatively, the second communication interface in particular can be configured to take operating data into account when sending the permissible actuator command. The communication device is therefore configured to perform an operating status check and, if necessary, an authorization check in addition to the permissibility check. The safety of the control system can be further increased by taking operating data into account, for example through the second communication interface, by ensuring under certain conditions that, although permissible, safe actuator commands are not sent from the communication device to the actuator in the specific situation, they are still not sent from the communication device to the actuator. For example, when an actuator is operating at high performance, it can be prevented that a hysteresis test or the like desired by the control electronics is carried out. It is also conceivable that during the execution of a test of the actuator initiated by the control room or by an operating electronics unit, no further test is started by an operating electronics unit. Alternatively or additionally, the communication device, in particular its first communication interface (e.g. a transceiver interface), is designed to send operating data from the actuator to the operating electronics. The communication device can thus transmit operating data, such as measured values, diagnostic results or similar, to the control electronics, so that the control electronics can display the operating data or carry out (further) diagnostic routines on the basis of the operating data.

In an exemplary embodiment, the communication device, in particular its first communication interface or communication electronics, such as a microcontroller or microprocessor, the communication device comprises an interpreter device which is configured to convert the electrical signals received from an operating electronics into preferably standardized electrical signals which are independent of the operating electronics and/or specific to the actuator, in particular for the permissibility checker, preferably for comparison with the permissible actuator commands stored in the data memory. An interpreter device can, for example, be designed to receive electrical signals of different formats and/or different operating electronics units, for example, on the one hand smartphones with an Android operating system and on the other hand smartphones with a Windows operating system or an iOS operating system, and to carry out a conversion, in particular into actuator commands, which are, for example, independent of the operating system of the smartphone, in order to permit a simple comparison with the permissible, preferably actuator-specific formatted actuator commands stored in the data memory of the admissibility checker. The interpreter device may alternatively or additionally be designed to perform an actuator-specific conversion of the incoming electrical signals, namely into electrical actuator commands corresponding to a special actuator assigned to the communication device. For example, depending on the type of actuator to be controlled and its configuration, a HART command, a Fieldbus command or an analog 4-20 mA signal may be required for control.

The present disclosure is also directed to a system which, in an exemplary embodiment, comprises at least one actuator, for example a control valve, a pump or the like, for adjusting a process fluid flow of a process-engineering plant, such as a chemical plant, in particular a petrochemical plant, a food-processing plant, a power station or the like, as well as at least one communication device as described above, and optionally at least one control electronics. In an exemplary embodiment, the system comprises a process control network with several actuators, preferably of different type. In particular, the system may have two, three, four or more communication devices as described above, which may be configured differently, for example such that one communication device each in a process control network is assigned to exactly one actuator or to at least one actuator each. In particular, the system may comprise several communication devices which are interconnected in accordance with the signal transmission. In an exemplary embodiment, several communication devices can be connected to each other via their respective second communication interfaces, such as by means of a bus system, such as a HART bus system, a field bus system or the like, in accordance with signal transmission.

It is conceivable that a system having a process control network comprising a plurality of actuators has a smaller number of communication devices than actuators, such as only one, two or three communication devices, wherein one or more communication devices may be arranged to control or filter the communication between at least one control electronics and a plurality of actuators with one or more permissibility checkers as described above, so that in this way a decentralized control room can be realized with a communication device. A process plant can, for example, have several decentralized process control networks, each of which has a communication device that performs a higher-level control function with regard to the actuators of the process control network subgroup. In an exemplary embodiment, the at least one communication device is connected to the several actuators and, if necessary, to the other communication devices via a bus system, such as a HART bus system or the like, according to signal transmission. Alternatively, the entire process control network of a process plant can have a communication device acting as a decentralized control station.

The present disclosure is also directed to a control interaction method which, according to an exemplary embodiment, comprises defining a series of permissible actuator commands, such as actuator setpoints, for initiating predetermined functions, in particular for actuating an actuator, for example a control valve, a pump or the like, preferably for setting a process fluid flow of a process-engineering plant, such as a chemical plant, in particular a petrochemical plant, a food-processing plant, a power station or the like. The disclosure-based control interaction method further comprises that a signal, such as an actuator command, is transmitted from operating electronics such as a smartphone, a tablet, a control console or the like, and that the signal is received by a communication device and tested by the communication device, and that further no actuator command or one of the permissible actuator commands is transmitted to an actuator by the communication device as a function of the signal. The predefined permissible actuator commands are given to the communication device which receives a signal such as an actuator command from an electronic control unit such as a smartphone. The signal received by the control electronics is checked by the communication device with regard to whether the signal can be assigned to one of the predefined permissible actuator commands. If it is possible to assign the received command to one of the permissible actuator commands, this permissible actuator command is sent to an actuator that has preferably been predefined and assigned to the communication device. If the communication device receives a signal from an electronic control unit to which it cannot assign a reliable actuator command, the communication device does not send an actuator command.

In an exemplary embodiment of the control interaction procedure, the testing of the signal includes checking whether the signal corresponds to an actuator command of the series of permissible actuator commands, after which the actuator command corresponding to the signal is transmitted. For example, the communication device or a subunit of the communication device, such as a permissibility checker, may perform an identity comparison or an approximate comparison of the signal received by the communication device from the control electronics with respect to the series of predefined permissible actuator commands, as described above.

In an exemplary embodiment of a control interaction method, an authorization check relating to the received signal is carried out, in particular it being checked whether the received signal comprises an authorization identifier, and a permissible actuator command being transmitted only if an authorization identifier is detected. By performing an authorization check as part of the control interaction procedure, a second safety measure is added to the permissibility check in order to ensure that the operating electronics or the person using them have sufficient authority to initiate a desired actuator command which may be defined as permissible.

In an exemplary embodiment of a control interaction method, defining the set of permissible actuator commands comprises deactivating or setting inactive a mechanical and/or electronic write protection of the communication device which, in particular in a default activated state, prevents the communication interface or the communication device, preferably in a data memory, from being able to write to the data memory of the communication interface or the data memory of the communication device or of the permissibility checker and predefined as permissible actuator commands are changed by a signal received preferably by means of the first communication interface from an operating electronics and/or wherein the definition of the series of permissible actuator commands can be carried out exclusively via a physical, mechanical and/or electronic communication interface.

In an exemplary embodiment of the control interaction method, which can be combined with one or more other embodiments described herein, the communication device receives operating data from the actuator, for example operating data such as valve position, control difference, control signals, actuator signature information, actuator hysteresis information or the like, whereby in particular the test described above is carried out depending on these received operating data and as a result permits or prevents the transmission of permissible actuator commands. Alternatively or additionally, the operating database is taken into account when sending an actuator command. For example, an actuator operating data-dependent test of the signal received by the operating electronics may, for example, permit a further safety precaution such that, even if the signal can be assigned to an admissible actuator command and has possibly also been received by an authorized operating electronics unit, the admissible actuator command is nevertheless not transmitted under predetermined circumstances, for example, if an operating date is detected which, if it is present, for example in accordance with a test routine, prevents the transmission of any or the assigned admissible actuator command. Such an operating date can, for example, be an emergency-closing state of a control valve, in the presence of which a hysteresis test triggered by a control electronics must not take place. The test can also be performed taking into account a control difference transmitted by the actuator to a communication device, so that the signal received from the control electronics is first assigned a (first) actuator command with respect to a setpoint position, which is corrected according to the control difference, so that a (second) actuator command differing by the control difference from the (first) actuator command is transmitted from the communication device to the actuator.

Alternatively or additionally, the communication device, in particular its first communication interface, transmits operating data from the actuator to the control electronics. Preferably, the control interaction method also includes further processing of the operating data by means of the operating electronics, for example display of operating data by the operating electronics, and/or execution of one or more diagnostic routines by the operating electronics.

In an exemplary embodiment of a control interaction method, after signal reception and preferably before signal testing, the signal which has been transmitted by the operating electronics and received by the communication device is converted, in particular by an interpreter device, into a signal format which is preferably standardized, is independent of the operating electronics and/or specific to the actuator, in particular for testing, preferably for comparison with the predefined permissible actuator commands. The signal interpretation step by the communication device allows downstream actuators to be designed to be compatible with a wide variety of operating electronics devices, so that a communication system that can be used in the long term is provided despite the rapid further development in the mobile communications sector. The signal interpretation step ensures that signals of different signal formats, for example from a smartphone with Apple iOS, can be processed just as well as a signal from a smartphone with Android operating system.

It is clear that the communication device may in particular be designed to carry out a control interaction in accordance with the control interaction procedure described above. In particular, the control interaction procedure is arranged in such a way that it can proceed according to the functionality of the communication device or system described above. The system described above can in particular be designed to carry out the control interaction procedure. Further advantageous configurations are indicated in the dependent claims.

The communication device which is used between one field device or several field devices of a process control network on one side and on the other side of operating electronics such as a smartphone, a tablet, a web-based app or the like has as its main task to ensure that safety-critical states, malfunctions or damage as a result of deliberate or unintentional operating errors by the user of an operating electronics are excluded. For this purpose, the communication device performs a filter function in such a way that only those actuator commands that are predefined as permissible in the communication device can be initiated by the control electronics as a result of trigger signals or actuator command signals. The communication device has a positively defined list of permissible actuator commands, for example in the form of a whitelist and/or in the form of permissible control ranges and/or permissible classes of commands, such as interrogation signals with which (only) results are interrogated but no setpoint signals are generated for an actuator, and control signals which realize or imply one or more setpoint positions, and/or combinations thereof. The communication device can ensure that when an actuator is remotely controlled by an electronic control unit, the remote control by the electronic control unit moves only within a predefined safe range. If the control electronics sends a signal to the communication device that falls outside the permissible range or to which the communication device cannot assign any actuator commands that have been predefined as permissible, the communication device does not send an actuator command to the actuator that wishes to manipulate the control electronics.

In an exemplary embodiment, the communication device is configured to ensure compatibility between different actuators on the one hand and different electronic control units on the other. With regard to the different control valves, the communication device may, for example, be configured to contain permissible control valve commands related to the field device(s) to which the communication device is connected during installation and/or maintenance work on a process plant. Furthermore, the communication device allows compatibility with a wide variety of control electronics devices, such as computers or web browser-based apps, smartphones, tablets, control consoles, or the like, to enable them to address actuator commands to one or more actuators without the control electronics having to be specially configured for this purpose, in particular adapted to the actuator to be controlled. For the user of control electronics, this results in a significant simplification of the control of an actuator by almost any control electronics, while at the same time faulty controls are avoided by the communication device.

In the schematic view shown in FIG. 1, the communication device is generally marked with the reference number 1. The communication device 1 is in communication connection with an actuator 5 or field device of a process plant, for example a chemical plant, in particular a petrochemical plant, a food processing plant, a power plant, or the like, which is not described in detail below.

The actuator 5 can, for example, be a control valve, a pump or the like in order to influence a process fluid flow in a process plant. In an exemplary embodiment, actuator 5 is an active actuator with an active setting function for influencing a process fluid flow, for example as a control valve of a pump. Alternatively, the actuator 5 can also be designed as a passive actuator without active control functions and with sensor functions only.

Communication between communication device 1 and actuator 5 can, for example, take place via a communication interface with bus system 15, for example within the framework of a HART or Fieldbus system architecture of a process control network. In particular, the connection between communication device 1 and a field device 5 with a hardware interface, for example as a plug contact, can be implemented. For example, communication device 1 can be connected as an additional module to a field device installed on the control and/or supply units of a process plant, between the socket on the field device side and a control and/or supply unit for this field device. Alternatively, another communication input and/or output of an existing actuator of a process plant can be used for a communication device.

For example, an electropneumatic field device in accordance with the application DE 10 2012 021 387 B3, which is designed in such a way that a communication device 1 is implemented as an electronic component as described in the paragraphs [0052] to [0054] there, in order to be inserted into one of the slots of the actuator described in DE 10 2012 021 387 B3, can serve as an actuator, to provide an additional communication interface to the control valve, which may otherwise be designed as described in FIG. 1, 3, 4, 5 or 6, for example, with which the control valve 1 can be controlled by external control electronics according to predefined permissible control valve commands.

In an exemplary embodiment, communication from the operating electronics 3 to the communication device 1 is wireless, at least in sections, via a radio network, such as a mobile radio network or WLAN or Wifi network.

In an exemplary embodiment, the communication device comprises several data memories 21, 23 and 25. A receive memory 21 is used to store the signal S received from the control electronics 3 via the communication connection 13, which can be, for example, an application sent to the communication device 1 by a control electronics designed as a smartphone.

In an exemplary embodiment, the communication device 1 comprises communication electronics 11, which may, for example, include a microcontroller or microprocessor. The communication electronics 11 has an interpreter which, for example, translates the signals S loaded into the input memory 21 as an application, preferably into execution sections. Execution sections can be defined specifically for the actuator 5 connected to the communication device 1 independently of the individual operating electronics 3. Execution sections may be used by the communication electronics 11 to transmit predetermined permissible actuator commands b, for example in the form of binary sequences, to an actuator 5 for dispatch via the process plant internal bus system 15, such as a HART system, a fieldbus system or other process control networks, as described in the above-mentioned application DE 10 2012 021 387 B3. In an exemplary embodiment, permissible actuator commands b can be sent from communication device 1 to control electronics, such as a microprocessor, of a positioner of an actuator. Such actuator commands can trigger an actuator-specific predetermined function, such as a partial stroke test or the like, in the actuator. An actuator 5 with integrated control electronics can also be referred to as a field device.

A data memory 25, which can be referred to as a whitelist memory, contains a series of permissible actuator commands b, for example in the form of binary sequences. In an exemplary embodiment, these binary sequences cannot be changed by the control electronics 3.

In an exemplary embodiment, the communication electronics 11 comprise a permissibility checker which ensures that only those actuator commands b are sent from communication device 1 to the connected actuator or field device 5 which are predefined in the data memory 25. For example, the communication electronics 11 can be designed to translate the signal S received from the operating electronics 3 into a field device-specific or at least communication device-specific standardized execution section with an interpreter, which leaves the communication electronics 11 to issue a specific actuator command b to the field device 5. However, before the actuator command b is sent from communication device 1 to actuator 5, the permissibility checker of the communication electronics 11 checks whether a command b corresponding to the translated actuator command is predetermined as permissible in the data memory 25. Only then is the actuator command b issued to the field device 5. In an exemplary embodiment, the permissibility checker is a verification processor that is configured to verify that a command b corresponding to the translated actuator command is permissible in the data memory 25.

If, on the other hand, the control electronics 3 sends a signal S to the communication device 1, which is intended to cause an impermissible actuator command a to be forwarded to field device 5, the check determines that the impermissible actuator command a is not assigned a corresponding impermissible actuator command b in the data memory 25. The impermissible actuator command a is therefore not sent from communication device 1 to field device 5.

In order to make communication device 1 independent of the manufacturer's preconfigurations, the data memory 25 is equipped with a secured local interface 31, e.g. a plug contact directly on communication device 1, via which it is possible to write to the permissible actuator commands b stored in the data memory 25. In an exemplary embodiment, the safe interface 31 is only designed to allow safe cable connection communication with the data memory 25 to modify, for example correct, change, delete or add 25 allowable actuator commands b stored in the data memory.

Via the safe interface 31, further safety-relevant functions of communication device 1 can be changed, e.g. permissible operator identifications can be specified, or administrative rights can be assigned to certain users or certain operating devices, so that different users or operating electronics devices can be individually specified, preferably different actuator commands are permissible. Authorizations to execute the functions or certain binary sequences can, for example, be sent as a start signal or start sequence (initial execution section) from an electronic control unit 3 to communication device 1.

In an exemplary embodiment, communication device 1 includes one or more additional measurement data and/or diagnostic data memory 23. In an exemplary embodiment, the measurement data and/or diagnostic data memory 23 is designed to receive measurement and/or diagnostic data from at least one field device 5 connected to the communication device 1. The measurement data and/or diagnostic data memory can preferably be used to store field device-specific operating data, in particular with an assigned time stamp. Operating data can be, for example, the valve position of an actuator 5 designed as a control valve, a control difference of an active actuator, setpoint control signals, for example, from a control room to the actuator 5, actuator signature information relating to the type, type or concrete structure of the field device 5, actuator hysteresis information or the like.

In an exemplary embodiment, the communication device 1 can be configured to receive a signal S from the control electronics 3, which initiates a diagnostic function with respect to the field device 5 connected to the communication device 1. If communication device 1 determines that the signal corresponds to a valid actuator command b to cause field device 5 to initiate a valid diagnostic function, communication device 1 sends the corresponding valid actuator command b to field device 5 to perform the diagnostic function there. It is clear that a field device can be equipped with its own control and/or regulation electronics which are equipped to automatically perform a diagnostic function which is only triggered by a diagnostic start command. It is also clear that the actuator 5 can perform a diagnostic function specified by the communication device 1 according to a setpoint value or the like received successively as a group of permissible actuator commands b. This is particularly advantageous if an actuator 5 does not have its own control and/or regulation electronics.

In response to the diagnostic function performed by the field device 5, 23 operating data d, D related to the diagnosis are stored in the diagnostic data memory. If the diagnosed field device 5 has its own sensors, the operating data d can be sent from the sensors of the field device 5. The field device 5 may have control and/or regulation electronics that have implemented diagnostic routines that can output already prepared diagnostic results that can alternatively also be returned as operating data d from the field device 5 to the communication device 1.

In an exemplary embodiment, the communication device 1 is configured to output operating data D to the control electronics 3. The diagnostic results or other operating data D output from communication device 1 to the operating electronics 3 via communication connection 13 can be output in a format that is adapted to the operating electronics 3 that initiated the diagnosis. For this purpose, the above described or a further interpreter of the communication electronics 11 can be provided, which can prepare operating data D from the field device 5 for output to the operating electronics 3.

The operating electronics 3 can be configured to output D, operating data or protocols, such as SIL protocols, or other diagnostic results on the basis of the received diagnostic or other operating data. The output can, for example, be in the form of a graphic reproduction on a display or in the form of a printed protocol or the like.

Operating data D, which, for example, can be read out cyclically in a rolling sequence or continuously in defined time intervals, concern, for example, the valve position, a control difference, setpoint control signals and assigned actual stroke positions of a control valve as well as valve signature or hysteresis tests, i.e. the course of the actual stroke positions in relation to a setpoint valve position for a predetermined sequence of setpoint control valves.

Typical diagnostic procedures can be conveniently initiated by remote control electronics, such as a tablet, with the aid of a communication device according to the disclosure, for example to determine an alternating zero point or a creeping zero point shift as a result of wear on the valve seat and/or valve plug, for example due to contamination.

For diagnostic purposes, for example, operating data D can be called up, for example by means of an open-close diagnosis including the actual stroke end position determined therein, increasing and/or decreasing running times, and/or increasing and/or decreasing breakaway times or the like. It is also possible to perform a full stroke test. The output of processing operating data D by control electronics 3 can, for example, be carried out using traffic light colors in accordance with the relevant NAMUR recommendation.

The communication device can have a relatively large data memory 23 which is considerably larger than that of conventional positioners 5 in order to provide extensive documentation options for operating data d of an actuator 5 as required, for example to permit extensive data acquisition in a pilot plant.

The bus system 15, which is connected to the communication device 1, can establish a connection of the communication device 1 to several field devices 5 (not shown in detail), so that 3 actuator commands b for at least one of several field devices 5 can be initiated with the aid of a communication device 1 by a control electronics 3. In this way, for example, part of the actuators 5 of a process plant can be addressed by an external operating electronics 3 from an operating electronics 3. For example, a number of passive actuators 5, which have only sensor functions and do not include their own actuators such as control valves or pumps, could be addressed, so that with an external control electronics 3 measurement data D can be interrogated from the several passive field devices 5 of the process plant via the communication device 1.

A communication device 1, which communicates via a bus system 15 with several field devices 5, may also be configured to send 3 permissible actuator commands b to at least one of several actuators 5 of the process plant in response to corresponding signals S from the control electronics. For example, a single electronic control unit 3 can initiate one or more diagnostic tests simultaneously or one after the other on actuators 5 of a process plant.

Communication device 1 can, in the form of a multiplexer or hub based on signals S, transmit 3 actuator commands b from the control electronics to individual ones of several actuators 5 connected to a bus system 15. It is also possible that several field devices 5 in a process plant are each equipped with a communication device 1 as described above. A process plant that comprises several field devices 5 with individual communication devices 1 can comprise a network in which the communication devices 1 and/or 5 are connected to each other via a common bus system 15 and can preferably communicate via the bus system 15. For example, a HART bus network is suitable as bus system 15 for sending actuator commands to several field devices 5.

In an exemplary embodiment, in a process control network comprising a plurality of field devices 5 each having individually assigned communication devices 1, the communication devices 1 may be subdivided relative to each other into a communication hierarchy. In the process control network, for example, one communication device 1 may be the master communication device overriding the other communication devices that are designed as slave communication devices. The actuator commands or communication signals sent by the master communication device 1 may, in such an architecture, have a higher priority with respect to the actuator commands or communication signals from the (remaining) slave communication devices. It is clear that even in a process control network with one master communication device 1 and several slave communication devices, the number of actuators 5 addressed by the communication devices may be less than the number of communication devices, whereby a single communication device 1 may be assigned several actuators 5 (not further specified).

A process engineering plant in which a bus network is provided as part of its process control network, which bus network comprises a communication device 1 in accordance with the disclosure, enables this part to be configured as a decentralized control network, the communication device being able to carry out process control and/or regulation within the framework of the actuator commands specified as permissible.

It is also conceivable to completely equip a process engineering plant with a process control network which has a communication device 1 which is designed in particular as a master communication device for controlling and/or regulating the entire process engineering plant within the framework of the actuator commands predetermined as permissible in the communication device. Such a system architecture is particularly suitable for small process engineering systems or such process engineering systems which, for example, are isolated in poorly accessible areas and are operated remotely by the system operator.

The features revealed in the above description, the figures and the claims can be of importance both individually and in any combination for the realization of the disclosure in the various configurations.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM).

The memory can be non-removable, removable, or a combination of both.

REFERENCE LIST

1 Communication device
3 Operating electronics
5 Actuator/Field device
11 Communication electronics
13 Communication interface
15 Bus-System
21 Reception memory
23 Diagnostic data memory
25 Data memory
31 Interface
a, b Actuator commands
d, D Operational data
S Signal

The invention claimed is:

1. A communication device for control interaction between operating electronics and an actuator to set a process fluid flow of a process-engineering plant, the communication device having control and/or regulating electronics configured to activate the actuator based on one or more actuator command signals, the communication device comprising:
a first communication interface configured to receive electrical signals from the operating electronics;
a second communication interface configured to provide electrical actuator commands to the actuator; and
a permissibility processor having a data memory that stores permissible actuator commands, the permissibility processor being configured to cause the second communication interface to provide one of the permissible actuator commands to the actuator based on an electrical signal of the electrical signals received via the first communication interface, wherein the second communication interface is configured to take into account operating data when one of the permissible actuator commands is transmitted.

2. The communication device according to claim 1, wherein the permissibility processor is configured to:
compare the electrical signal received via the first communication interface from the operating electronics with the permissible actuator commands stored in the data memory to detect whether one of the permissible actuator commands corresponding to the received electrical signal is stored in the data memory; and
if the data memory includes one of the permissible actuator commands that corresponds to the received electrical signal, cause the second communication interface to send the one of permissible actuator command corresponding to the received signal to the actuator.

3. The communication device according to claim 1, wherein the permissibility processor is configured to:
perform an authorization check relating to the electrical signal received via the first communication interface to check whether the electrical signal includes an authorization identifier; and
cause the second communication interface to send the one of the permissible actuator commands to the actuator based on the authorization check.

4. The communication device according to claim 1, wherein the data memory includes a mechanical and/or electronic write protection configured to prevent the permissible actuator commands stored in the data memory from being changed by the electrical signal received via the first communication interface and/or configured to permit write access to the data memory exclusively via a third communication interface.

5. The communication device according to claim 1, wherein:
the second communication interface is configured to receive the operating data from the actuator, the permissibility processing being configured to permit and/or prevent transmission of the permissible actuator commands based on the operating data, and/or
the first communication interface is configured to transmit the operating data from the actuator to the operating electronics.

6. The communication device according to claim 1, wherein the communication device includes an interpreter converter configured to convert the electrical signals received from the operating electronics into standardized electrical signals independent of the operating electronics and/or specific to the actuator to facilitate comparison of the standardized electrical signal with permissible actuator commands stored in the data memory by the permissibility processor.

7. A system comprising:
the actuator; and
at least one communication device according to claim 1.

8. A control-interaction method, comprising:
defining a series of permissible actuator commands for initiating actuation of an actuator and storing the permissible actuator commands in a memory of a communication device;
receiving, a signal from operating electronics by the communication device;
receiving operating data from the actuator by the communication device;
by a verification processor of the communication device:
accessing the stored permissible actuator commands and comparing the received signal to the stored permissible actuator commands to verify the received signal; and
transmitting, by the communication device, an actuator command to the actuator, based on the received operating data and the verification of the received signal, to control the actuation of the actuator.

9. The method according to claim 8, wherein the verifying comprises determining whether the received signal corresponds to an actuator command of the series of permissible actuator commands, the corresponding actuator command being transmitted to the actuator by the communication device.

10. The method according to claim 8, further comprising performing an authorization check relating to the received signal to determine whether the received signal includes an authorization identifier, the actuator command being transmitted to the actuator if the authorization identifier is recognized.

11. The method according to claim 8, wherein defining the series of permissible actuator commands includes deactivating a mechanical and/or electronic write protection of the communication device that prevents the permissible actuator commands stored in a data memory of the communication device from being changed by the received signal.

12. The method according to claim 8, wherein the verification is performed based on the received operating data such that actuator commands are transmitted, and/or the operating data is transmitted from the actuator to the operating electronics by the communication device.

13. The method according to claim 8, wherein after signal reception and before signal verification, the received signal is converted into a standardized signal format independent of operating electronics and/or specific to the actuator.

14. The method according to claim 8, wherein:
the signal from the operating electronics is received using a first communication interface of the communication device;
the operating data is received from the actuator using a second communication interface of the communication device; and
the actuator command is transmitted to the actuator using the second communication interface.

* * * * *